US00RE43352E

(19) United States
(12) Reissued Patent
Cipriani

(10) Patent Number: US RE43,352 E
(45) Date of Reissued Patent: *May 8, 2012

(54) MECHANISM FOR BRAKING THE UNWINDING OF A BUNDLE OF METALLIC WIRE HOUSED IN A DRUM

(75) Inventor: Giancarlo Cipriani, Bibbiena-Arezzo (IT)

(73) Assignee: Lincoln Global, Inc., Cleveland, OH (US)

( * ) Notice: This patent is subject to a terminal disclaimer.

(21) Appl. No.: 11/776,331

(22) Filed: Jul. 11, 2007

(65) Prior Publication Data

US 2007/0295853 A1 Dec. 27, 2007

Related U.S. Patent Documents

Reissue of:
(64) Patent No.: 5,845,862
Issued: Dec. 8, 1998
Appl. No.: 08/854,691
Filed: May 12, 1997

U.S. Applications:
(63) Continuation of application No. 09/712,836, filed on Nov. 14, 2000, now Pat. No. Re. 40,351.

(30) Foreign Application Priority Data

Jul. 24, 1996 (IT) ..... AR96A0022

(51) Int. Cl.
*B65H 59/02* (2006.01)

(52) U.S. Cl. ..... 242/423.1; 242/128; 242/156.1

(58) Field of Classification Search ..... 242/156, 242/156.1, 156.2, 423.1, 566, 593, 125.3, 242/172, 419, 157 R
See application file for complete search history.

(56) References Cited

U.S. PATENT DOCUMENTS 318,062 A 5/1885 Warren
532,565 A 1/1895 Kilmer
617,353 A 1/1899 Redmond
627,722 A 6/1899 Edwards
(Continued)

FOREIGN PATENT DOCUMENTS

CN 1626423 A 6/2005
(Continued)

OTHER PUBLICATIONS

CA 2,205,755 Office Action dated Jan. 17, 2005.
(Continued)

*Primary Examiner* — William A Rivera
(74) *Attorney, Agent, or Firm* — Hahn Loeser & Parks LLP; Jason R. Strobel

(57) ABSTRACT

A circular crown shaped pressure disk (1), furnished with, on its external rim, jutting stirrup shaped, flexible elements (2) whose size makes them press on the internal surface of the drum (7) within which the disk is housed. The internal rim of the disk is equipped with winglets (3) and with flexible tabs (5) directed nearly tangentially in respect to the tubular trunk (8), placed at the center of the drum (7). The flexible tabs are for stopping the rise of the bundle of coils so as to impede their knotting and to help guiding the wire, as it is pulled to the outside of the drum and unwound from the bundle.

5 Claims, 1 Drawing Sheet

U.S. PATENT DOCUMENTS

| | | | | |
|---|---|---|---|---|
| 932,808 | A | | 8/1909 | Pelton |
| 1,640,368 | A | | 8/1927 | Obetz |
| 1,907,051 | A | | 5/1933 | Emery |
| 2,059,462 | A | | 11/1936 | Jungmann |
| 2,407,746 | A | | 9/1946 | Johnson |
| 2,713,938 | A | | 7/1955 | Snyder |
| 2,724,538 | A | | 11/1955 | Schweich |
| 2,838,922 | A | | 6/1958 | Gift |
| 2,849,195 | A | | 8/1958 | Richardson |
| 2,864,565 | A | | 12/1958 | Whearley |
| 2,869,719 | A | | 1/1959 | Hubbard |
| 2,880,305 | A | | 3/1959 | Baird |
| 2,929,576 | A | | 3/1960 | Henning |
| 2,966,258 | A | | 12/1960 | Krafft |
| 2,974,850 | A | | 3/1961 | Mayer |
| 3,185,185 | A | | 5/1965 | Pfund |
| 3,244,347 | A | | 4/1966 | Jenk |
| 3,463,416 | A | | 8/1969 | Quenot |
| 3,478,435 | A | | 11/1969 | Cook |
| 3,491,876 | A | | 1/1970 | Zecchin |
| 3,512,635 | A | | 5/1970 | Lang |
| 3,565,129 | A | | 2/1971 | Field |
| 3,567,900 | A | | 3/1971 | Nelson |
| 3,576,966 | A | | 5/1971 | Sullivan |
| 3,595,277 | A | | 7/1971 | Lefever |
| 3,648,920 | A | | 3/1972 | Stump |
| 3,724,249 | A | | 4/1973 | Asbeck et al. |
| 3,729,092 | A | | 4/1973 | Marcell |
| 3,799,215 | A | | 3/1974 | Willems |
| 3,815,842 | A | | 6/1974 | Scrogin |
| 4,044,583 | A | | 8/1977 | Kinney, Jr. |
| 4,074,105 | A | | 2/1978 | Minehisa et al. |
| 4,102,483 | A | | 7/1978 | Ueyama et al. |
| 4,172,375 | A | | 10/1979 | Rushforth et al. |
| 4,188,526 | A | | 2/1980 | Asano |
| 4,222,535 | A | | 9/1980 | Hosbein |
| 4,254,322 | A | | 3/1981 | Asano |
| 4,293,103 | A | | 10/1981 | Tsukamoto |
| 4,464,919 | A | | 8/1984 | Labbe |
| 4,546,631 | A | | 10/1985 | Eisinger |
| 4,582,198 | A | | 4/1986 | Ditton |
| 4,585,487 | A | | 4/1986 | Destree et al. |
| 4,623,063 | A | | 11/1986 | Balkin |
| 4,869,367 | A | | 9/1989 | Kawasaki et al. |
| 4,891,493 | A | | 1/1990 | Sato et al. |
| 4,949,567 | A | | 8/1990 | Corbin |
| 5,078,269 | A | | 1/1992 | Dekko et al. |
| 5,109,983 | A | | 5/1992 | Malone et al. |
| 5,205,412 | A | | 4/1993 | Krieg |
| 5,227,314 | A | | 7/1993 | Brown et al. |
| 5,261,625 | A | | 11/1993 | Lanoue |
| 5,277,314 | A | | 1/1994 | Cooper et al. |
| 5,314,111 | A | | 5/1994 | Takaku et al. |
| 5,372,269 | A | | 12/1994 | Sutton et al. |
| 5,452,841 | A | | 9/1995 | Sibata et al. |
| 5,494,160 | A | | 2/1996 | Gelmetti |
| 5,553,810 | A | | 9/1996 | Bobeczko |
| 5,590,848 | A | | 1/1997 | Shore et al. |
| 5,692,700 | A | | 12/1997 | Bobeczko |
| 5,739,704 | A | | 4/1998 | Clark |
| 5,746,380 | A | | 5/1998 | Chung |
| 5,816,466 | A | | 10/1998 | Seufer |
| 5,819,934 | A | | 10/1998 | Cooper |
| 5,845,862 | A | * | 12/1998 | Cipriani ..... 242/423.1 |
| 5,865,051 | A | | 2/1999 | Otzen et al. |
| 5,971,308 | A | | 10/1999 | Boulton |
| 6,019,303 | A | | 2/2000 | Cooper |
| 6,301,944 | B1 | | 10/2001 | Offer |
| 6,322,016 | B1 | | 11/2001 | Jacobsson et al. |
| 6,340,522 | B1 | | 1/2002 | Burke et al. |
| 6,464,077 | B1 | | 10/2002 | Liu |
| 6,648,141 | B2 | | 11/2003 | Land |
| 6,708,864 | B2 | | 3/2004 | Ferguson, III et al. |
| 6,745,899 | B1 | | 6/2004 | Barton |
| 6,821,454 | B2 | | 11/2004 | Visca et al. |
| 7,152,735 | B2 | | 12/2006 | Dragoo et al. |
| 7,178,755 | B2 | * | 2/2007 | Hsu et al. ..... 242/423.1 |
| 7,220,942 | B2 | | 5/2007 | Barton et al. |
| 2002/0003014 | A1 | | 1/2002 | Homma |
| 2002/0014477 | A1 | | 2/2002 | Lee et al. |
| 2004/0020041 | A1 | | 2/2004 | Ferguson, III et al. |
| 2004/0155090 | A1 | | 8/2004 | B.-Jensen |

FOREIGN PATENT DOCUMENTS

| | | | |
|---|---|---|---|
| DE | 1011840 | B | 7/1957 |
| DE | 1082215 | | 11/1957 |
| DE | 2122958 | | 11/1972 |
| DE | 2202177 | | 7/1973 |
| EP | 0519424 | A1 | 12/1992 |
| EP | 0686439 | A1 | 12/1995 |
| EP | 1057751 | A1 | 12/2000 |
| FR | 1215111 | | 4/1960 |
| FR | 2055181 | | 5/1971 |
| FR | 2595674 | | 3/1988 |
| GB | 880502 | | 10/1961 |
| GB | 1168928 | | 10/1969 |
| GB | 1229913 | | 4/1971 |
| GB | 2059462 | | 4/1981 |
| JP | 49-13065 | | 2/1974 |
| JP | 54-043856 | | 4/1979 |
| JP | 55-156694 | | 12/1980 |
| JP | 56-023376 | | 3/1981 |
| JP | 57-102471 | | 6/1982 |
| JP | 58-035068 | | 3/1983 |
| JP | 58-70384 | | 5/1983 |
| JP | 59-197386 | | 11/1984 |
| JP | 59-229287 | | 12/1984 |
| JP | 59-232669 | | 12/1984 |
| JP | 60-021181 | | 2/1985 |
| JP | 60-032281 | | 2/1985 |
| JP | 60-184422 | | 9/1985 |
| JP | 60-223664 | | 11/1985 |
| JP | 61-293674 | | 12/1986 |
| JP | 62-009774 | | 1/1987 |
| JP | 62-111872 | | 5/1987 |
| JP | 62-287055 | | 12/1987 |
| JP | 63-147781 | | 6/1988 |
| JP | 1-240222 | | 9/1989 |
| JP | 03264169 | A | 11/1991 |
| JP | 04-133973 | | 5/1992 |
| JP | 4-274875 | | 9/1992 |
| JP | 08-150492 | | 6/1996 |
| JP | 08-267274 | | 10/1996 |
| JP | 2000-225468 | | 8/2000 |
| JP | 2000-263239 | | 9/2000 |
| JP | 2001-150187 | | 6/2001 |
| JP | 2004-025242 | | 1/2004 |
| JP | 2004-025243 | | 1/2004 |
| SU | 793678 | | 1/1981 |
| SU | 1412830 | | 7/1988 |
| WO | 8810230 | | 12/1988 |
| WO | 94-00493 | | 1/1994 |
| WO | 94-19258 | | 9/1994 |
| WO | 00-50197 | | 8/2000 |
| WO | 03-106096 | A1 | 12/2003 |

OTHER PUBLICATIONS

ESAB Marathon Pac Endless Feedability, ESAB Market Communications/BA/November/2004, 27 pages.

Now there's no end to robot productivity. Uninterupted Mag-Welding With Endless Marthon Pac Wire Delivery, Mar. 11, 2004, pp. 1-8.

Lincoln Electric Completes Italian Acquisition, News/Lincoln Electric, web page, Aug. 23, 2009.

U.S. Appl. No. 60/298,555, filed Jun. 15, 2001, for "S" Shaped Cast in Wire Applicant David J. Barton.

Premium Quality Twist-Free Robotic Welding Wire, Prostar, Nov. 1997.

Premium Quality Twist-Free Robotic Welding Wire, Prostar, Jul. 1999.

Premium Quality Twist-Free Robotic Welding Wire, Prostar, Apr. 2000.

Weld Point Robotic Welding Wire, Technology of the Future, LEITC000532-LEITC000539, Jan. 23, 2001.

* cited by examiner

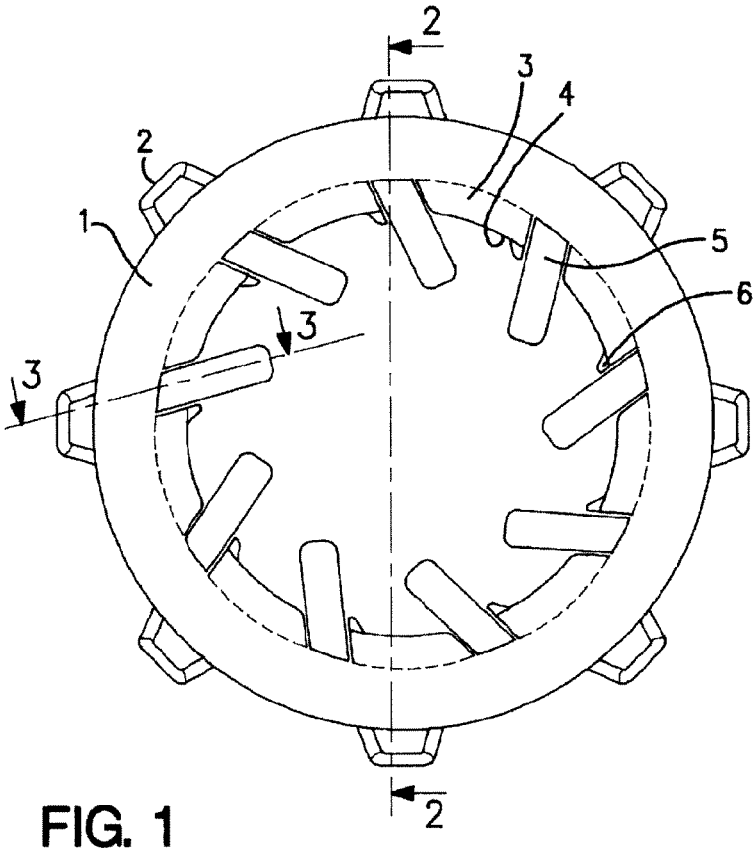
FIG. 1
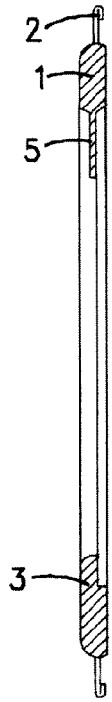
FIG. 2
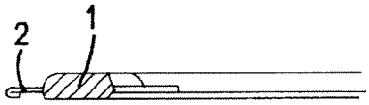
FIG. 3
FIG. 4
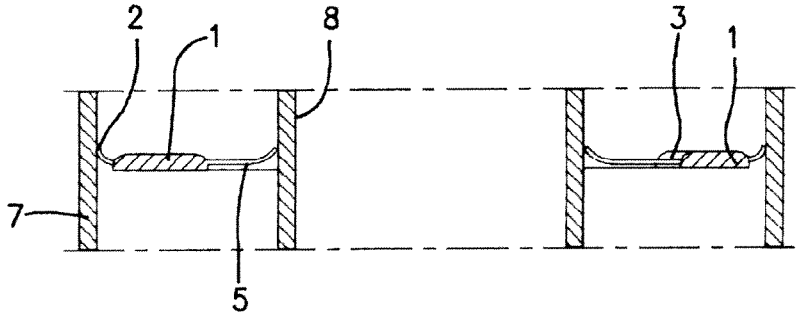

MECHANISM FOR BRAKING THE UNWINDING OF A BUNDLE OF METALLIC WIRE HOUSED IN A DRUM

Matter enclosed in heavy brackets [ ] appears in the original patent but forms no part of this reissue specification; matter printed in italics indicates the additions made by reissue.

*This application is a Continuation Reissue Application of Reissue application Ser. No. 09/712,836 filed on Nov. 14, 2000, now Reissue Pat. No. Re. 40,351, reissued Jun. 3, 2008 of U.S. Pat. No. 5,845,862 issued on Dec. 8, 1998.*

BACKGROUND OF THE INVENTION

1. Field of the Invention

The invention concerns a mechanism for the braking of the unwinding of a bundle of metallic wire housed in a container drum and aimed particularly at feeding soldering machines, in particular those operating continuously, with automatic advancing of the wire that constitutes the weld metal.

2. Description of the Prior Art

Coils of metal wire are used, particularly in the field of continuous soldering machines, where said wire is unrolled and carried to the soldering point where it is melted to join the two parts to be soldered.

When the quantity of wire being used is large, instead of being wound in rolls of a few [kilogrammes] *kilograms* in weight, the metallic wire, is contained as a bundle of various quintals inside a drum with a positioning cylindrical core, so that it is capable of feeding the soldering machine for a long period of time, eliminating in this way its frequent stoppage due to lack of the same soldering wire.

This type of feeder drum is positioned, when operative, with its axis in vertical position and the wire of the bundle is pulled up by a dragging unit. Due to the extreme elasticity of the wire and of its tendency to straighten out, when it is pulled towards the outside, various turns tend to rise together and they can become tangled among each other so as to provoke the stoppage of its advancement. This inconvenience is being presently avoided by the use of a crown shaped weight, placed inside the drum and on the bundle of wire with the aim of avoiding the rising of various turns at the same time and therefore their tangling up.

However, there is a clearance between said crown and the inner surface of the drum's contour and between the crown and the surface of the inner tubular trunk which keeps the bundle in position, without said clearance, due to the fact that the drums are not strictly identical to one another, the crown shaped weight could adhere to said surfaces and not slide enough to maintain itself adherent to the bundle, as the wire is used, or could impede the unwinding of the wire because of the pressure placed on the contours of the drum where it adheres, and would end up by carrying out a blockage on the wire that should instead move forward.

If instead the crown shaped weight should have a relatively ample clearance compared to the internal surface of the drum and of the internal tubular trunk, the movement of the coils at the top of the bundle, determined by the unrolling movement, could bring said turns or parts of them above the pressure disk and interact with it to form a knot, therefore blocking the unwinding of the bundle and consequently of the soldering machine.

SUMMARY OF THE INVENTION

Taking the disadvantages and problems of the above technique into consideration, consequently one of the main aims of this invention is to find a device which can stop the turns of the bundle inside the feeding drum from lifting from the bundle itself. This to avoid the tangling up of the wire that would stop the wire feeding unit therefore also the soldering machine.

Another aim of this invention is to find a device that can act on drums that are not strictly identical and that can avoid that one or more coils should pass over the device itself and therefore get tangled on it causing the advancement of the wire from the bundle which is being unrolled, to stop.

A further aim is to [realise] *realize* a low cost relatively light device, capable of carrying out a non-excessive but regular braking action in time, while the bundle unwinds. This *is* to avoid stress on the unit that pulls the wire from the bundle to allow an even pull towards the welding point to allow a uniform soldering in time.

An invention that can reach said results is particularly advantageous because it allows the use of drums containing metal wire bundles of various sizes. It allows the correct unwinding of the bundles, without the tangling up of the wire, and a correct feed of the non stop welding machines so that these latter ones can carry out uniform and sized welds as foreseen while making the project. This means without waste due to anomalous feed of the welding wire.

The invention which allows us to obtain said results consists in a circular crown shaped device, equipped with jutting flexible stirrup shaped elements on the external rim. The size of these elements is such that they can adhere, eventually by inflecting, on to the inner surface of the drum within which it will be placed. On its inner rim the crown is also equipped with guiding winglets and flexible tabs oriented in an almost tangential direction in respect to the tubular trunk placed at the center of the drum, such as to reach it to block the lifting from the bundle of turns and therefore to avoid their tangling and consequently to help guide the wire as it is pulled and unwound from the bundle to the outside of the drum.

The stirrup shaped elements, placed on the outside of the circular crown shaped structure, are such as to avoid the wire from the bundle to pass over from the external edge of the invention and to position itself over it, thus avoiding their tangling up. The flexible structure of these stirrups is such as to allow the use of the invention also when the drum in which it is placed has a reduced diameter compared with the one foreseen.

The internal winglets and flexible tabs are instead adequate to help direct the wire toward the tubular trunk in the middle of the drum. Said wire is pulled from the outside and at the same time the winglets and flexible tabs avoid the coils at the top of the bundle—on which the invention is placed—to move excessively and to emerge from the same winglets and tabs.

In this way the bundle is forced to unwind in a correct way, and thanks to the light weight of the invention, which is normally made through a [moulding] *molding* process of plastic materials, without having to exercise a considerable pressure that would determine an excessive braking action on the wire pulled by the dragging group.

BRIEF DESCRIPTION OF THE DRAWINGS

More features of the invention and the advantages which it determines will clearly appear in the following description, which is referred to a preferred shape in its execution, however it is illustrated as a pure example which by no means is limiting, in the figures of the enclosed drawing, in which:

FIG. 1 is the layout view of the lower part of the invention;

FIG. 2 is the view along the AA section line of FIG. 1;

FIG. 3 is the partial view along the BB section line of FIG. 1;

FIG. 4 is the view on a different scale of a section of the drum with the invention inserted on it, sectioned with an axial plane.

However, it must be clear that the drawings and the corresponding described parts are given exclusively as the illustration of the object of the invention, without in any way constituting a limitation of it.

DESCRIPTION OF THE PREFERRED EMBODIMENTS

In the drawings we have indicated with 1 the circular shaped crown structure, with 2 the stirrup shaped flexible elements, with 3 the shaped winglets, with 4 their external profile, with 5 the flexible tabs, with 6 the thin skeletons that connect the winglets 3 with the tabs 5, with 7 the drum, with 8 its central tubular trunk. In substance, the invention consists in a device capable of carrying out a braking and containing action in the unwinding of the metal wire wound into a bundle and placed inside a containing drum 7, having a tubular center 8. The wire being used to feed welding machines and in particular those operating non stop (welding robots).

Said device operates a braking action on the movement of the coils at the top of the bundle that is being unwound. It consists in an element which can carry out a slight pushing action on the coils and is formed by [a] circular crown 1 having [on its outer edge distributed stirrup] *a thickness extending between a top surface and a bottom surface of the crown. The crown extends between an inner edge and an outer edge and, based on the thickness of the crown, the crown is non-flexible. Stirrup* shaped flexible elements 2[, with a dimension that allows] *can be equally distributed about the outer edge of the crown and are thinner than the crown thickness to allow* their adherence—bending inwards if necessary—to the internal surface of the drum 7 in which the invention is positioned. [In this way it can stop the] *Further, the stirrups can be U-Shaped. By utilizing flexible stirrups 2,* external parts of the coils *can be prevented* from rising along the internal surface of the drum 7 and [to go over] *rising above* the level of the pressure disk itself [and as a consequence of]. *If the wire is allowed to spring up between the device and the wall of the container,* the pulling action[,] *of* the wire could move *the springing wire* close to the tubular trunk 8 and create a knot on the disk 1 with the effect of stopping its normal flow.

On its inner edge [the] disk 1 is equipped with distributed guiding winglets 3 and flexible tabs 5. [The former having the] *Flexible tabs 5 can be generally rectangular and extend at a non-perpendicular angle from the inner edge. The flexible tabs also have a front edge facing the wire during the unwinding and an opposite rear edge. The front edge is at an angle less than 90 degrees from the inner edge of disk 1 wherein the wire travels along the front edge during the unwinding of the wire from the coil. Winglets 3 have a side* profile 4 [of the side] oriented towards the axis of [the] drum 7, connected to the thin skeleton 6 curved into a spiral towards the center of the same drum, so that the wire of the bundle, when pulled, is evenly sustained and guided towards the center of the drum 7 to emerge from it staying adherent to the tubular trunk 8 against which it is pushed by the sequence of flexible tabs 5 that follow it as it unwinds.

The invention therefore carries out two actions, the first one consisting in a braking action that also regulates the movement of the coils at the top of the bundle, in fact said movement would be turbulent and disorganized without it. The second action is that of convoying the wire that unwinds making it emerge from the drum 7 in an almost axial direction as well as a rotatory one to follow the coils that unwind from the bundle.

I claim:

[1. A device for braking the unwinding of bundled metal wire placed in a drum, for the feeding of welding machines having an automatic advancing movement of the wire, the device having a circular crown with jutting flexible elements on its outer edge for pressing on an inner surface of the drum, and further comprising guiding winglets and flexible tabs on an inner edge of the crown.]

[2. The device as claimed in claim 1, wherein said jutting flexible elements are stirrup-shaped.]

[3. The device as claimed in claim 1, wherein the winglets have a circular inner periphery, the inner periphery including a skeleton curved into a spiral towards a center of the crown.]

[4. The device as claimed in claim 1, wherein the flexible tabs are oriented in an almost tangential direction toward a circle interior to the inner edge of the crown and are for suppressing inadvertent release of the wire in the drum.]

*5. A device for braking the unwinding of bundled metal wire placed in a container of welding wire, for the feeding of welding machines having an automatic advancing movement of the wire, the container having an internal surface, said device comprising a circular crown having an outer peripheral edge which is spaced from the internal surface of the container which allows said device to descend with the unwinding of the wire, said device further including inwardly extending flexible tabs on an inner edge of said crown having a front edge facing the wire exiting the bundle of wire during the unwinding of the wire, said flexible tabs on said inner edge being generally rectangular and extending at a non-perpendicular angle from said inner edge such that the wire traveling along said front edge during the unwinding is urged radially inwardly, said device further including guide winglets between each of said flexible tabs, said guide winglets each having an inner profile that is arcuate.*

*6. The device as described in claim 5, wherein said guide winglets further include a skeleton on said inner profile and extending inwardly and toward an adjacent one of said flexible tabs.*

*7. A device for braking the unwinding of bundled metal wire placed in a container, for the feeding of welding machines having an automatic advancing movement of the wire, the container having an internal surface, said device comprising a crown portion having an outer peripheral edge which is spaced from the internal surface of the container which allows said device to descend with the unwinding of the wire and an inner peripheral edge opposite of said outer edge, said crown having a thickness between said inner and outer edges, said device further includes inwardly extending flexible tabs on said inner edge of said crown having a front edge facing the wire during the unwinding, said flexible tabs having a thickness less than said crown thickness and extending from said inner edge at a non-perpendicular angle, said flexible tabs further including a front edge facing the wire being unwound from the bundled wire such that the wire travels along said front edge during the unwinding, said front edge being at an angle less than 90 degrees from said inner edge such that the wire is urged inwardly during the unwinding, said device further including U-shaped flexible elements on the outer edge of said crown, said U-shaped flexible ele-*

*ments engaging the internal surface of the container and being transverse to said outer edge.*

*8. A device for braking the unwinding of bundled metal wire placed in a container, for the feeding of welding machines having an automatic advancing movement of the wire, the container having an internal surface, said device comprising a circular crown having an outer peripheral edge which is spaced from the internal surface of the container which allows said device to descend with the unwinding of the wire and an inner peripheral edge opposite of said outer edge, said crown having a crown thickness between said inner and out edges, said device further including inwardly extending flexible tabs on said inner crown edge and said tabs each having a front edge facing the wire exiting the bundle of wire during the unwinding of the wire, said each tab being generally rectangular and extending at a non-perpendicular angle from said inner edge and having a tab thickness less than said crown thickness, said device still further including guide winglets between each of said flexible tabs, said guide winglets each having a inner profile that is arcuate.*

*9. The device as described in claim 8, wherein said guide winglets further include a skeleton on said inner profile and extending inwardly and toward an adjacent one of said flexible tabs.*

* * * * *